(12) United States Patent
Hughes

(10) Patent No.: US 9,669,370 B2
(45) Date of Patent: Jun. 6, 2017

(54) ANIMAL FEED MIXING AND DISPENSING APPARATUS

(71) Applicant: NEWROCK ENGINEERING LIMITED, Belfast (GB)

(72) Inventor: Samuel Hughes, Collone (GB)

( * ) Notice: Subject to any disclaimer, the term of this patent is extended or adjusted under 35 U.S.C. 154(b) by 108 days.

(21) Appl. No.: 14/398,973

(22) PCT Filed: May 2, 2013

(86) PCT No.: PCT/IB2013/053484
§ 371 (c)(1),
(2) Date: Nov. 4, 2014

(87) PCT Pub. No.: WO2013/164785
PCT Pub. Date: Nov. 7, 2013

(65) Prior Publication Data
US 2015/0138914 A1    May 21, 2015

(30) Foreign Application Priority Data
May 4, 2012  (GB) .................................. 1207920.8

(51) Int. Cl.
*B01F 15/02*   (2006.01)
*B01F 7/00*    (2006.01)
(Continued)

(52) U.S. Cl.
CPC .......... *B01F 15/0274* (2013.01); *A01K 5/002* (2013.01); *B01F 7/0025* (2013.01); *B01F 13/0035* (2013.01)

(58) Field of Classification Search
CPC . A01K 5/002; B01F 13/0035; B01F 15/0274; B01F 7/0025
See application file for complete search history.

(56) References Cited

U.S. PATENT DOCUMENTS 3,672,640 A  *  6/1972  Crose ..................... A01K 5/002
                                            366/300
4,298,289 A  * 11/1981  Walley ................... A01K 5/002
                                            241/101.76
(Continued)

FOREIGN PATENT DOCUMENTS

CA       2218472      12/2005
EP       0427483      5/1991
(Continued)

*Primary Examiner* — Tony G Soohoo
(74) *Attorney, Agent, or Firm* — Edwin Tarver

(57) ABSTRACT

A feed mixing and dispensing apparatus includes a container mountable on a transport. The container has a longitudinal axis, a transverse axis and a vertical axis, a pair of opposite end walls, a pair of opposite side walls and a base wail and a top opening. The longitudinal axis extends substantially parallel to the direction of travel of the container, while the transverse axis is substantially perpendicular to the direction of the travel of the container. A mixing shaft connected to a drive means is rotatably mounted inside the container and comprises mixing members for breaking up and mixing the feed. The mixing shaft extends between the side wails substantially perpendicular to the longitudinal axis of the container. A feed discharge arrangement is provided for discharging the mixed feed from the container.

17 Claims, 15 Drawing Sheets

(51) Int. Cl.
*B01F 13/00* (2006.01)
*A01K 5/00* (2006.01)

(56) References Cited

U.S. PATENT DOCUMENTS

| | | | | |
|---|---|---|---|---|
| 4,373,845 A * | 2/1983 | Henke | A01D 90/105 | |
| | | | 198/671 | |
| 4,506,990 A * | 3/1985 | Neier | A01K 5/002 | |
| | | | 366/299 | |
| 4,707,140 A * | 11/1987 | Mohrlang | A01K 5/002 | |
| | | | 366/186 | |
| 4,712,922 A * | 12/1987 | Feterl | A01K 5/002 | |
| | | | 198/662 | |
| 4,741,625 A * | 5/1988 | Neier | A01K 5/002 | |
| | | | 198/671 | |
| 4,799,800 A * | 1/1989 | Schuler | A01K 5/002 | |
| | | | 366/296 | |
| 4,896,970 A * | 1/1990 | Schuler | A01K 5/002 | |
| | | | 198/672 | |
| 5,061,081 A * | 10/1991 | Walley | A01K 5/002 | |
| | | | 366/196 | |
| 5,143,310 A * | 9/1992 | Neier | A01K 5/002 | |
| | | | 241/101.8 | |
| 5,429,436 A * | 7/1995 | Stone | A01F 29/005 | |
| | | | 241/186.4 | |
| 5,462,354 A * | 10/1995 | Neier | A01K 5/004 | |
| | | | 366/314 | |
| 5,630,665 A * | 5/1997 | VanBruggen | A01K 5/002 | |
| | | | 366/186 | |
| 5,967,433 A * | 10/1999 | O'Neill | A01F 29/005 | |
| | | | 241/101.2 | |
| 8,646,967 B2 * | 2/2014 | Marggi | A01K 5/002 | |
| | | | 366/299 | |
| 2005/0099885 A1 * | 5/2005 | Tamminga | A01K 5/004 | |
| | | | 366/314 | |
| 2011/0064865 A1 * | 3/2011 | McCurdy | A01K 5/002 | |
| | | | 426/623 | |
| 2011/0180637 A1 * | 7/2011 | Kline | B01F 3/1221 | |
| | | | 239/670 | |
| 2015/0138914 A1 * | 5/2015 | Hughes | A01K 5/002 | |
| | | | 366/186 | |

FOREIGN PATENT DOCUMENTS

EP 1584226 6/2013
GB 2035822 6/1980

* cited by examiner

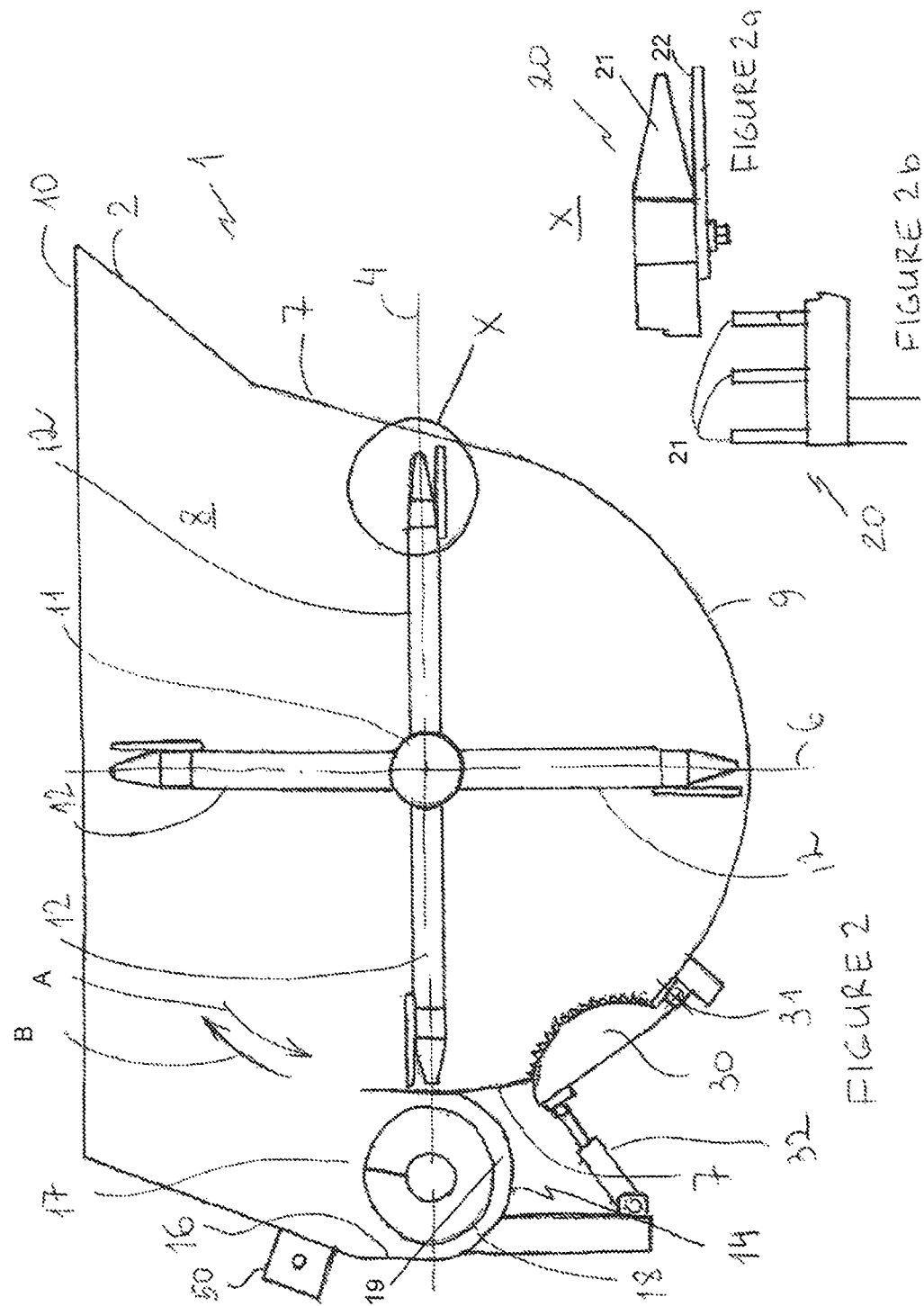

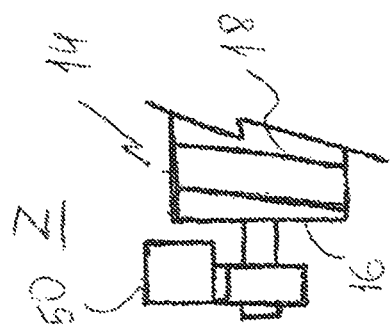
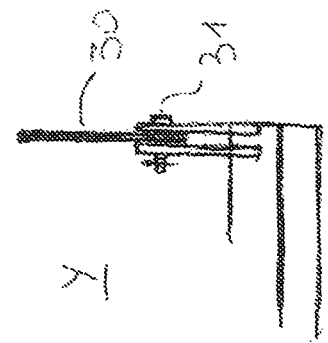
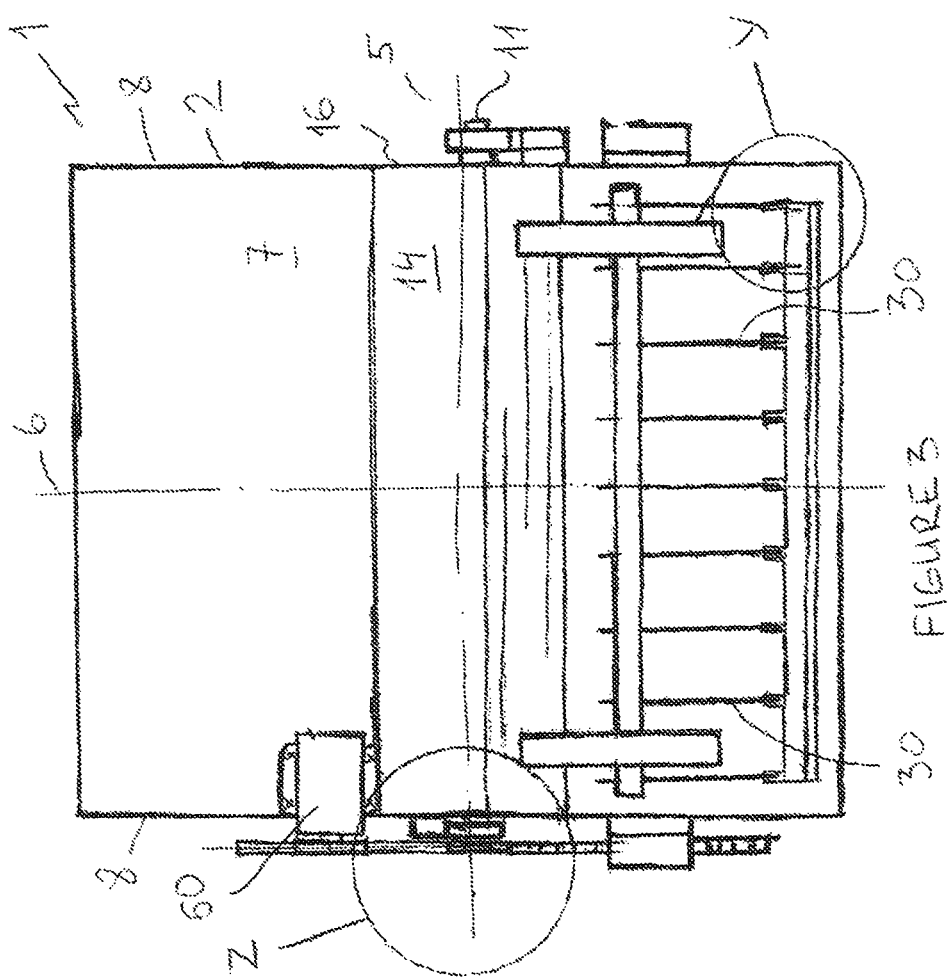

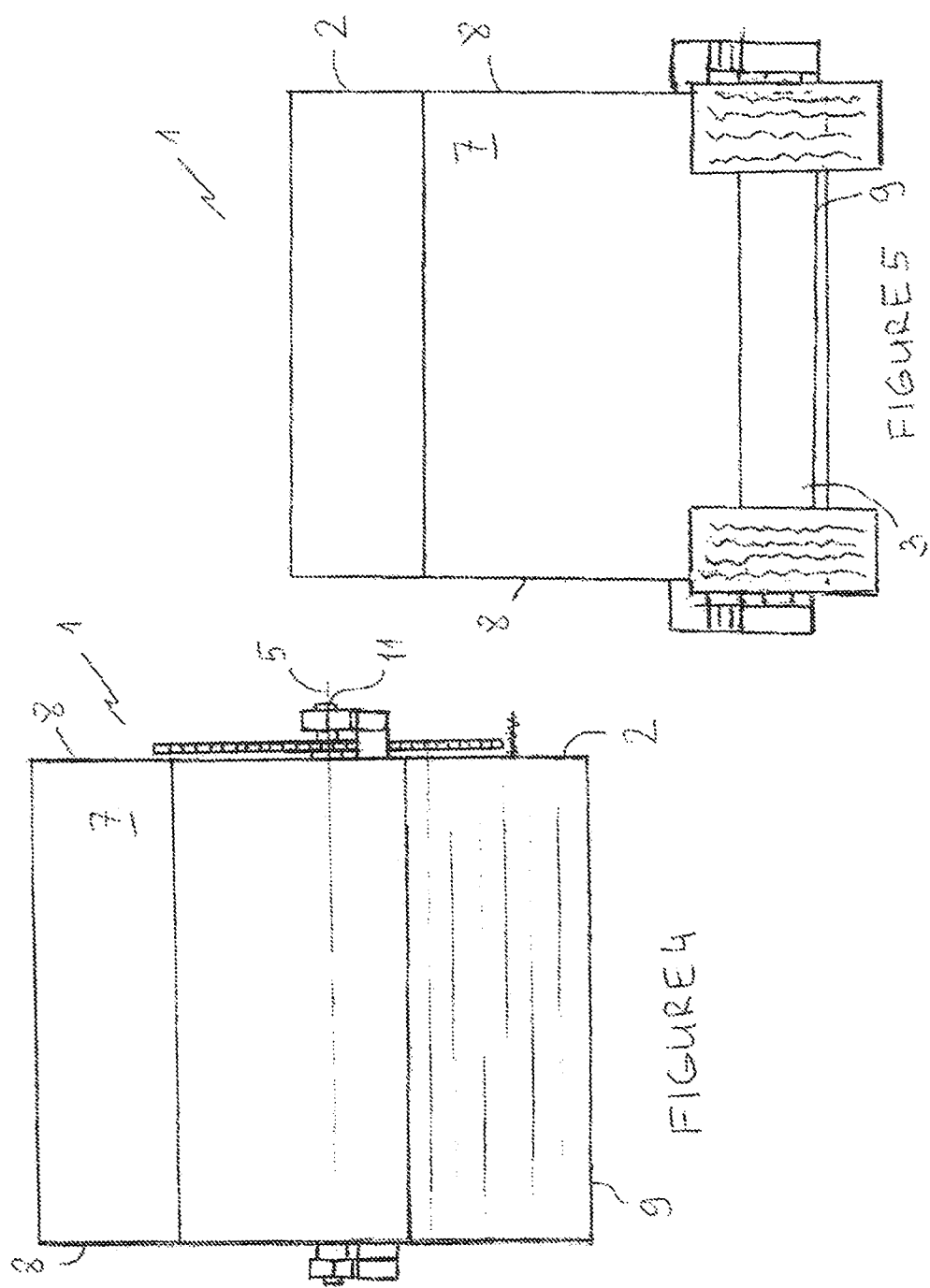

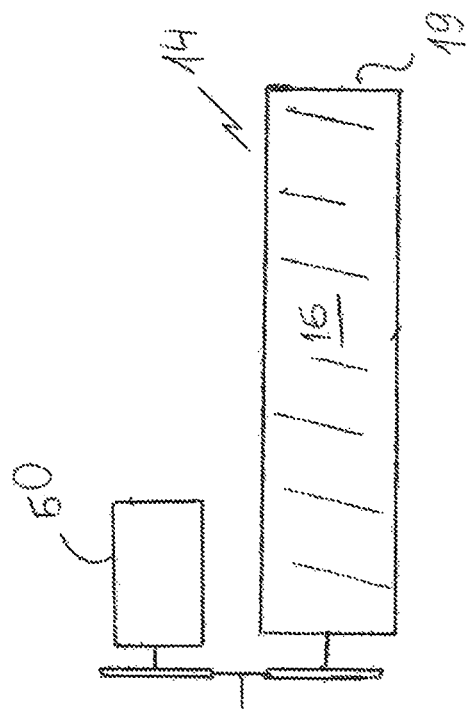
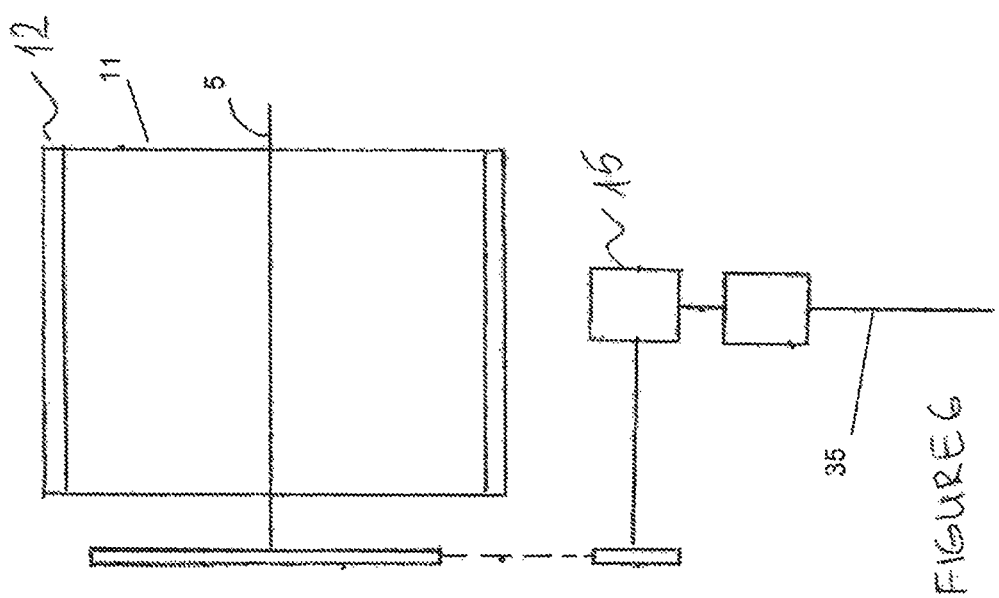

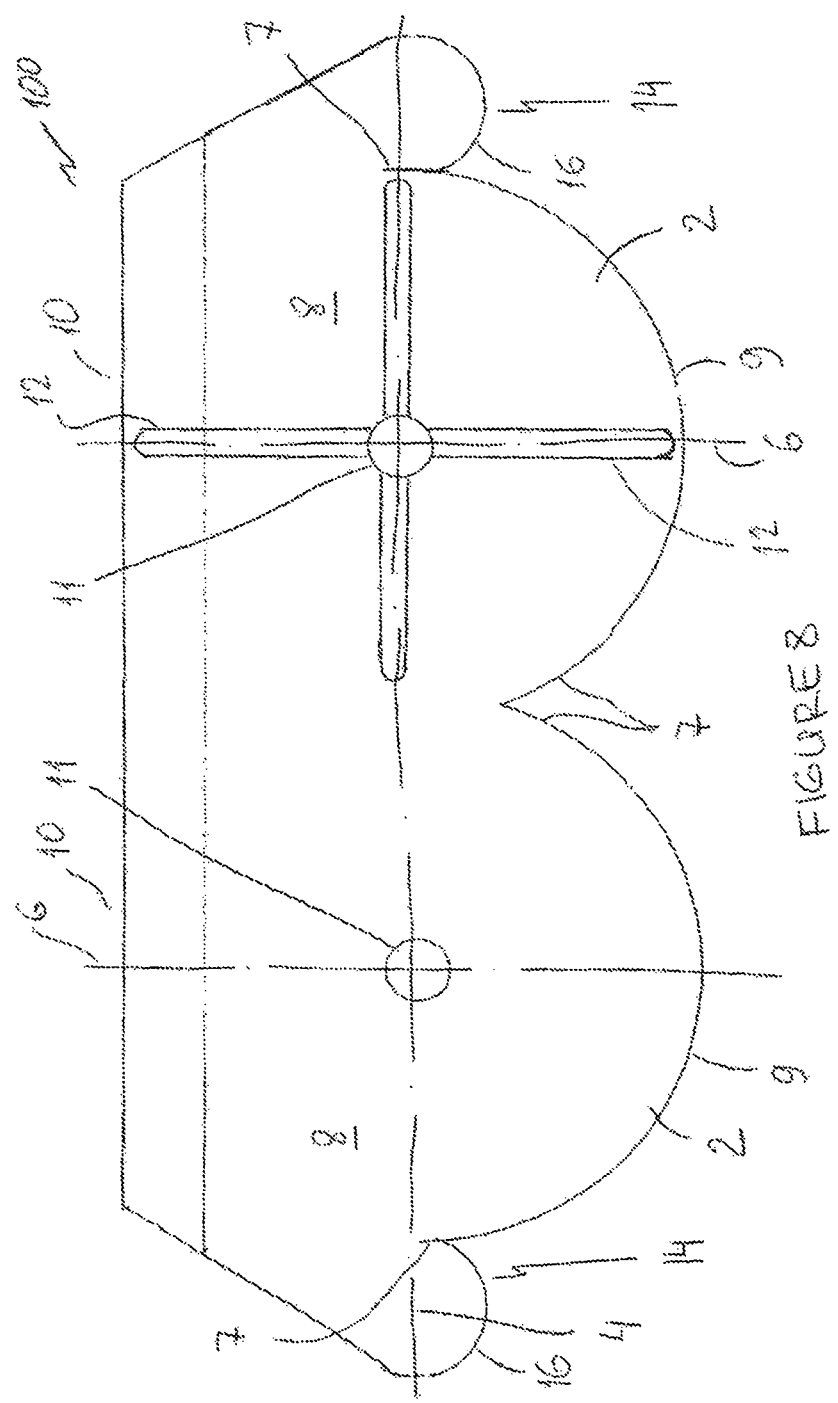

ANIMAL FEED MIXING AND DISPENSING APPARATUS

CROSS-REFERENCE TO RELATED APPLICATION(S)

This application claims the benefit of the priority filing date of Patent Cooperation Treaty application no. PCT/IB2013/053484, filed 2 May 2013, which claims priority in British application no. GB 1207920.8, filed 2 May 2012.

BACKGROUND

The present invention relates to a feeder wagon for mixing and dispensing animal feed, such as, but not limited to silage, straw, hay or a mixture of any of these ingredients with grain, cereal or other feed additives or supplements which may be liquid or solid.

Known diet feeders comprise a downwardly tapered container having a vertical mixing auger installed in center of the container. This type of diet feeder uses a feed outlet at the bottom of the container. Such a position of the feed outlet is not always desirable or convenient and additional lifting augers are required to elevate the feed.

Other known diet feeders have a long cylindrical or semi-cylindrical container mounted on a chassis with the longitudinal axis of the container oriented parallel to the direction of towing and a mixing shaft with mixing paddles mounted inside the container parallel to the longitudinal axis of the container. In such diet feeders, a feed outlet trough is usually mounted alongside the container, typically closer to the top of the container and the feed is elevated into the trough by the mixing shaft. A major drawback of such known diet feeders is that their diameter (i.e., the maximum dimension of the container transverse the longitudinal axis) is limited, as it cannot be too large to enable normal towing or maneuvering of the diet feeder. Accordingly, the mixing capacity of such a diet feeder is restricted.

One object of the invention is to mitigate the above disadvantages to provide a diet feeder in which the feed can be dispensed via an elevated chute and having a greater mixing capacity than known diet feeders.

SUMMARY

Accordingly, a feed mixing and dispensing apparatus comprises at least one container mountable on a transport means, the container having a longitudinal axis, a transverse axis and a vertical axis, a pair of opposite end walls, a pair of opposite side walls and a base wall. The end walls, the side walls and the base wall define an interior and a top opening of the container.

The longitudinal axis of the container in use extends substantially parallel to the direction of travel of the container and the transverse axis is substantially perpendicular to the direction of the travel of the container.

The container also includes a mixing shaft rotatably mounted within the interior of the container, the mixing shaft being connected to a drive means.

The mixing shaft extends between the side walls substantially perpendicular to the longitudinal axis of the container and comprises mixing members extending radially from the mixing shaft towards the end walls and the base wall of the container. The mixing members being configured to break up and mix the feed.

A feed discharge arrangement is provided in communication with the interior of the container for discharging the mixed feed from the container.

In one embodiment, the base wall of the apparatus is arcuate in a vertical plane parallel to the longitudinal axis of the container, thereby allowing the mixing members to reach all regions of the base wall so that no feed remains unmixed.

In another embodiment, the mixing members include a plurality of mixing paddles. Most preferably the mixing paddles include a pair of side arms extending radially from the mixing shaft and include a cross member connecting the side arms at an end distal from and substantially parallel to the mixing shaft.

In another embodiment, the cross members include a plurality of spaced apart spokes extending radially from the cross member. Preferably the spokes are spaced in paired arrangement along the cross member. Most preferably the cross member comprises at least six pairs of spokes along the cross member.

In another embodiment, the spokes are substantially planar and include a straight edge and a tapered edge. Preferably the tip of the spokes extend close to the interior end walls of the container so that no feed remains unmixed.

In a preferred embodiment, the diameter of the mixing paddles extending radially from the mixing shaft is almost twice the length of the mixing shaft. The large diameter allows for large round or square bales or other feed material to be directly dropped into the apparatus for shredding and mixing. Consequently there is less requirement to manage the size input of material into the container and less time and effort required in loading the container.

Additionally, the large diameter mixing members allow the mixed feed to be discharged at higher discharge heights than conventional feeder machines. This is an advantage when the feed has to be conveyed across feeding barriers or the like.

The elongated mixing paddles with the paired spokes extending radially from the cross member retain the load within then mixer resulting in less abrasion and resistance to the interior of the container. Preferably the load is carried and tumbled within the container at a slow speed. Consequently less energy is required to rotate the mixing members resulting in a more economical and more environmentally friendly system. The elongated mixing paddles also result in less mixing time being required than with conventional feeder mixers.

The elongated mixing paddles also result in less damage to the fiber of the material being mixed and provide a better mix. No compression force is applied to the mix material and the resultant feed mix is looser and fluffier. An increase in yield is also observed.

In one embodiment, the side walls at the top opening of the container are flanged. The flanged sides help to contain the material loaded within the container while mixing is in operation.

Preferably, the discharge arrangement in communication with the interior of the container for discharging the mixed feed from the container, is provided elevated from the base wall of the container. Ideally, the discharge arrangement is provided approximately midway between the base wall and the top opening and, preferably, nearer the top opening than the base wall. The discharge arrangement is preferably provided at an end wall of the container and the discharge arrangement may be modified to discharge the feed at a side wall of the container and indeed at multiple locations around the perimeter of the container. Furthermore, a discharge arrangement can provided at each of the opposite end walls of the container.

Ideally, the feed discharge arrangement comprises a trough having an open longitudinal side, the trough extending along an end wall of the container elevated from the base wall, the trough being arranged in communication with the interior of the container, preferably by mounting the trough alongside the end wall so that the open side of the trough adjoins the end wall for receiving the mixed feed from the container and a discharge auger rotatably mounted along the trough for transferring the feed along the trough to an outlet arrangement provided in the trough.

The outlet arrangement may be provided in the center or at one or both ends of the trough. In the latter configuration, the discharge auger is preferably reversible in order to deliver the feed to either end of the trough. Preferably, the trough includes a section extending along a side wall of the container. The trough may also be provided with multiple outlet arrangements.

Ideally, the mixing shaft is mounted substantially horizontally.

Preferably, the distance between the end walls is greater than the distance between the side walls. The distance between the end walls may also be equal to the distance between the side walls.

Preferably, the height of the container is equal or greater than the width, i.e. the distance between the side walls. The height of the container may also be equal to the width, i.e. the distance between the side walls.

Preferably, the discharge auger is driven by a motor, such as, for example, an hydraulic motor.

Advantageously, the mixing members are adapted to function as cutting members for cutting bulky feed material into smaller portions.

In one embodiment, the mixing shaft and the mixing members are mutually configured so that when the mixing shaft rotates in a first direction, the feed is retained in the interior of the container during mixing, whereas when the mixing shaft rotates in a second, opposite direction, the feed is transferred by the mixing members into the discharge arrangement.

In a preferred embodiment, the first direction is the direction of rotation wherein the mixing members near the discharge arrangement travel from the top opening to the base wall and the mixing members remote to the discharge arrangement travel from the base wall to the top opening, wherein the mixing members are configured so as to prevent the feed from getting into the discharge arrangement, whereas the second direction is the direction of rotation wherein the mixing members near the discharge arrangement travel from the base wall to the top opening and the mixing members remote the discharge arrangement travel from the top opening to the base wall, wherein the mixing members are configured so as to direct the feed into the discharge arrangement.

In one embodiment, the apparatus comprises two or more containers joined at their adjacent end walls. In such an embodiment, the mixing shafts of the containers may be driven by the same drive means, either simultaneously, or one mixing shaft at a time, or alternatively, the mixing shafts may each be driven by separate driver. In one variation of this embodiment, one or each container comprises a discharge arrangement at the end wall of the container remote from the joined end walls. Alternatively or additionally, the discharge arrangement is provided between the adjoining end walls of the containers. The first and second directions of the mixing shafts of the adjacent containers are adapted accordingly (i.e., the mixing shafts of the adjacent containers rotate in opposite directions and operate as mirror images of each other) for mixing and discharging the feed.

The provision of two or more containers as described above allows different types of feed to be processed, e.g. broken up, cut or mixed independently in the separate containers. Furthermore, it is possible to adapt adjacent containers so that in a first container the mixing shaft processes a batch of feed material in a first manner, for example, breaks up or cuts a batch of feed material and subsequently transfers the processed feed material into the second container, preferably via the discharge arrangement, wherein the mixing shaft of the second container processes the feed material in a second manner, for example, mixes a previously broken up or cut feed material.

In one embodiment, the mixing paddle comprises one or more elongate separator members which assist in pulling compacted or entangled fibrous feed material apart and mixing it with other feed ingredients. Also, the mixing paddle preferably includes a lifting member, preferably in the form of a strip of resilient flexible material, such as rubber for example, to facilitate lifting the feed material into the discharge arrangement while at the same time being gentle on the feed.

Preferably, the mixing shaft includes five mixing members evenly angularly spaced on the mixing shaft. Such a number of mixing members allows the feed material to be kept in constant motion during mixing thereby increasing the efficiency and quality of the mixing and reducing the power required to drive the mixing shaft. It will be appreciated, however, that the invention is not limited to a particular number of mixing members.

Each mixing member preferably comprises at least one radially extending support member and, typically, a pair of support members longitudinally spaced along the shaft, and a horizontal beam supported by the support members and radially spaced from the mixing shall. In known diet feeders, because the mixing shaft is relatively long compared to the diameter of the mixing container of a known diet feeder, two or more flights of mixing paddles need to be provided, that is several mixing paddles are mounted along the length of the mixing shaft. Such an arrangement is necessary in known diet feeders because it is not practical to provide a single mixing paddle with a long horizontal beam extending along the entire length of the mixing shaft because such a long mixing paddle, and in particular the horizontal beam of the mixing paddle, would be subjected to significant bending forces and may bend or break during mixing. In the apparatus described herein, due to the transverse orientation of the mixing shaft, a single flight of mixing paddles is sufficient because the length of a horizontal beam of such a mixing paddle is restricted to the width (i.e., the distance between the side walls) of the mixing container, and thus cannot be provided so long as to be subjected to dangerous bending forces during mixing.

Ideally, the lifting member is mounted on a mixing paddle in relation to a corresponding separator member so that when a mixing paddle is positioned near the discharge arrangement the lifting member is positioned above the separator member and when the mixing paddle is positioned diametrically remote the discharge arrangement the lifting member is positioned below the separator member. Accordingly, when the mixing shaft rotates in the first direction (i.e., during mixing), a separator member of a mixing paddle leads and strikes the feed first ahead of a corresponding lifting member, whereas the lifting member is deflected by the feed material backwards in relation to the direction of the rotation of the mixing shaft. This arrangement enables the separator members to break down and mix the feed material while at the same time preventing the feed from being pushed into the discharge arrangement. Conversely, when the mixing shaft rotates in the second direction (i.e., during discharge), a lifting member of a mixing paddle leads and contacts the feed first ahead of a corresponding separator member while at the same time the separator member supports the lifting member and prevents the lifting member from being deflected by the feed material backwards in relation to the direction of the rotation of the mixing shaft and as a result the lifting member pushes the feed material towards and into the discharge arrangement.

Conveniently, the driver of the mixer shaft is configured to be coupled with and driven by a drive mechanism of the vehicle. Preferably, the drive means of the mixer shaft is coupled to the mixing shaft via a redirecting mechanism which provides for the transfer of rotation from an axis of a drive shaft of the drive means which is substantially parallel to the longitudinal axis of the container, to the axis of the mixing shaft which is substantially transverse to the longitudinal axis of the container. In one embodiment, the redirecting mechanism comprises a gear arrangement, preferably a beveled gear arrangement.

Preferably, a reversing mechanism, such as, for example, a reverse gearbox, is provided for changing the direction of rotation of the mixing shaft so that the mixing shaft can discharge the feed to discharge arrangements provided at opposite end walls of the container. In one embodiment, the reversing mechanism is provided as a single unit together with the redirecting mechanism.

In a preferred embodiment of the invention the container comprises a plurality of blades, preferably, serrated blades, mounted inside the container protruding inwardly from the end walls or from the base wall of the container.

The blades facilitate the separation of compacted or entangled fibrous feed material into portions looser, smaller, or both, thereby aiding in achieving a consistent mix. Ideally, the blades are movably arranged to be fully or partially retracted from the interior of the container via slots formed in the end walls or the base wall of the container. The blades can be arranged to rotate about respective pivot points. The blades are preferably movable by a ram arrangement which can comprise a single ram for moving several blades or a plurality of rams for moving corresponding blades individually. The ram or rams can be, for example, hydraulic or pneumatic rams. This function is beneficial in that it allows the distance the blades protrude into the container to be regulated depending on the material being mixed and also allows the blades to be retracted fully from interior of the container when their use is not required or is not desirable. The serrated knives may be engaged for a certain period of time to break up items for example bales of straw or silage and then disengaged while normal mixing continues. It is important to be able to control the length that straw bales or baled silage or other feed material is cut so as to suit an animal's digestive system.

Preferably, in an embodiment including two or more containers joined at their adjacent end walls, the hydraulically engageable blades may also be located at the front end of the apparatus.

In one embodiment the blades are electronically controlled to move from a working cutting position to a non-working position. The blades may be set on a timer for easier loading and management. This would be advantageous for a farmer to control their own ration mix depending on the type of animals to be fed.

In a further embodiment, the container comprises a discharge arrangement near the base of the container and connected to the hydraulically controlled cutting blades. Preferably in this embodiment the hydraulically controlled cutting blades and discharge arrangement are located at the rear end of the container.

The discharge arrangement comprises a door which is movable very quickly between an open and shut state by a ram arrangement comprising at least two rams. The rams may be, for example, hydraulic or pneumatic rams. Mixed feed material may be discharged rapidly from the container onto the ground as the container is pulled in a forward direction.

Most preferably, the discharge arrangement comprises a dust reducing mechanism to prevent or at least minimize any dust raised when the feed is rapidly discharged.

Advantageously, the apparatus is mounted on a chassis and is connectable to a vehicle, such as for example a tractor.

In one embodiment, the chassis comprises a support for the container and a support for the drive mechanism for mixing the feed in the container. Preferably, the container is mounted on load cell weighing points. Most preferably the container is mounted on four load cell weighing points. The weighing points enable the farmer to know and adjust the percentage of feed mixes that are required for different animals at different times.

In one embodiment, the chassis comprises a short stub axle, as the wheel axle cannot pass through the large mixing container. The short stub axle has to be able to sustain a lot of stress. The short stub axle comprises a special member going up from the stub to take the side strain. The member goes upwards at an angle and connects with a main load cell weighing point. This stabilizes the side load on the stub axle and prevents the stub axle from splaying out. The chassis does not come in contact with the container except at the four load cell weighing points. The front of the chassis goes up at a right angle and takes the support or back strain imposed by the drawbar from another member reaching back to the stub member at the correct height level. The chassis ensures that the optimum center of gravity of the mixing and dispensing apparatus is achieved.

In one embodiment of the invention the chassis comprises a conveyor for conveying feed to where it is required. The conveyor preferably comprises a conveyor located substantially horizontally below an outlet on a discharge arrangement.

In one embodiment of the invention the conveyor is located below a central outlet arrangement in a trough extending along an end wall of the container and the conveyor runs substantially perpendicular to the direction of travel of the container. Preferably the chassis has an apparatus to move the conveyor hydraulically from side to side. Most preferably the chassis has hydraulically controlled side arms for moving the conveyor from side to side. In this way the mixed feed may be delivered to either side of the apparatus as required.

Advantageously the chassis has increased maneuverability enabling the feed mixing and dispensing apparatus to be guided into awkward areas where other conventional feeder machines would not be able to access.

The advantage of the apparatus is that it allows for a significantly greater height, compared to known diet feeders which are restricted in height because their height corresponds to the diameter of the longitudinally rotating mixing rotor which in turn corresponds to the width (i.e., the dimension transverse to the direction of travel of the diet feeder) of the container and the width of the diet feeder is in turn restricted to a certain maximum width in order not to affect the maneuverability of the diet feeder. Due to the transverse orientation of the mixing shaft, the width of the container can be kept within the required limits, while at the same time allowing the container to have a height significantly greater than the width thereby considerably increasing the mixing capacity of the container compared with known diet feeders.

The terms "rear", "front", "forwardly", "rearwardly" or the like used herein are relative and are related to a longitudinal axis of the container coinciding with the direction of towing of the diet feeder, whereas the terms "upper', "lower", "upwardly", "downwardly", "horizontal", "vertical" or the like are related to a ground surface on which the diet feeder is normally exploited. The invention will now be described with reference to the accompanying drawings which exemplify embodiments of the contemplated diet feeder.

BRIEF DESCRIPTION OF THE FIGURES

FIG. 2 is a side cross section of the diet feeder of FIG. 1;
FIG. 2a is an enlarged view of area X of FIG. 2 showing a mixing attachment of the mixing shaft of the diet feeder;
FIG. 2b is a plan view of the mixing attachment of FIG. 2a;
FIG. 3 is a front view of the diet feeder of FIGS. 1 and 2;
FIG. 3a is an enlarged view of area Y of FIG. 3 showing a pivot point of a movable blade of the diet feeder;
FIG. 3b is an enlarged view of area Z of FIG. 3 showing a drive connection of a discharge auger of the diet feeder;
FIG. 4 is a rear view of the diet feeder of FIGS. 1 through 3;
FIG. 5 is a rear view of the diet feeder of FIGS. 1 through 3 mounted on a chassis;
FIG. 6 is a schematic plan of a drive connection of the mixing shaft of the diet feeder of FIGS. 1 through 5;
FIG. 7 is a schematic plan of a drive connection of the discharge auger of the diet feeder of FIGS. 1 through 5;
FIG. 8 is a schematic side view of a further embodiment of a diet feeder having a pair of containers for mixing and dispensing feed with dispensing augers provided at opposite sides of the two containers.

DESCRIPTION

Figure 1:
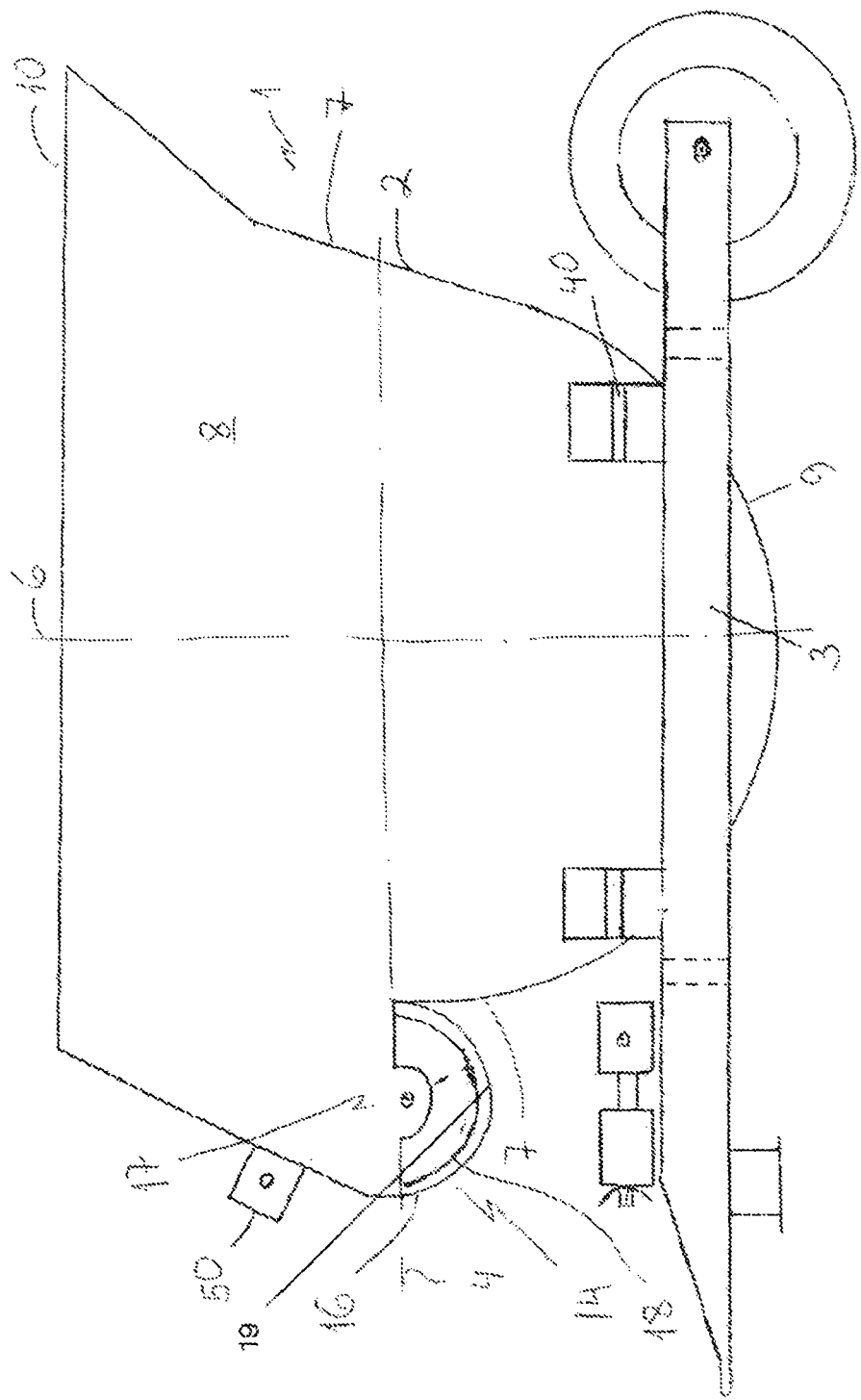
FIG. 1 is a side view of a diet feeder mounted on a chassis.

Referring initially to FIGS. 1 to 7 a feed mixing and dispensing apparatus 1 comprises at least one container 2 mountable on a transport, in the illustrated embodiment a chassis 3, connectable to a vehicle (not shown), such as a tractor. The container 2 has a longitudinal axis 4, a transverse axis 5 and a vertical axis 6; a pair of opposite end walls 7, a pair of opposite side walls 8 and a base wall 9. The end walls 7, the side walls 8 and the base wall 9 define an interior and a top opening 10 of the container 2.

The longitudinal axis 4 of the container 2 when in use extends substantially parallel to the 10 direction of travel of the container 2 on the chassis 3 and the transverse axis 5 is substantially perpendicular to the direction of the travel of the container 2.

The container 2 comprises a mixing shaft 11 rotatably mounted within the interior of the container 2. The mixing shaft 11 is connected to a drive mechanism (not shown) which is preferably a drive mechanism of the vehicle via a redirecting means, presently, a bevelled gear arrangement 15, which provides for the transfer of rotation from an axis 35 of a drive shaft (not shown) of the drive mechanism, which is substantially parallel to the longitudinal axis 4 of the container 2 to the axis 5 of the mixing shaft 11 which is substantially transverse the longitudinal axis 4 of the container 2.

The mixing shalt 11 extends substantially horizontally between the side walls 8 substantially perpendicular to the longitudinal axis 4 of the container and comprises mixing members 12 extending radially from the mixing shaft 11 to the end walls 7 and the base wall 9 of the container 2. The mixing members 12 are suitably configured to break up and mix the feed.

A feed discharge arrangement 14 is provided at an end wall 7 of the container 2 elevated from the base wall 9 of the container 2. The discharge arrangement 14 is arranged in communication with the interior of the container 2 for discharging the mixed feed from the container 2. In the embodiments described herein, the discharge arrangement 14 is provided approximately midway between the base wall 9 and the top opening 10. In other embodiments, the discharge arrangement 14 can be provided nearer the top opening 10 than the base wall 9, or nearer the base wall 9 than the top opening 10.

The feed discharge arrangement 14 comprises a trough 16 having an open longitudinal side 17. The trough 16 extends along an end wall 7 of the container elevated from the base wall 9, so that the open longitudinal side 17 is in communication with the interior of the container 2. The trough 16 is mounted alongside the end wall 7 so that the open side 17 of the trough 16 adjoins the end wall 7 for receiving the mixed feed from the interior of the container 2.

A discharge auger 18 is rotatably mounted along the trough 16 for transferring the feed along the trough 16 to an outlet opening 19 (FIG. 7) provided at one or both ends of the trough 16. In the latter configuration, the rotation of the discharge auger 18 is reversible in order to deliver the feed to either end of the trough 16. In other embodiments, the trough 16 can include a section extending along a side wall 8 of the container 2 if required. The trough 16 can indeed be provided with outlet openings at multiple locations around the perimeter of the container 2.

When the mixing shaft 11 rotates in a first direction indicated by arrow A in FIG. 2 (whereby the mixing members 12 near the discharge arrangement 14 travel from the top opening 10 to the base wall 9 and the mixing members 12 remote the discharge arrangement 14 travel from the base wall 9 to the top opening 10), the feed (not shown) is directed into the trough 16 through the opening 17. When the mixing shaft 11 rotates in a second, opposite direction indicated by arrow B in FIG. 2 (whereby the mixing members 12 near the discharge arrangement 14 travel from the base wall 9 to the top opening 10 and the mixing members 12 remote the discharge arrangement 14 travel from the top opening 10 to the base wall 9), the feed is retained in the interior of the container 2 during mixing.

In the embodiments herein described, the base wall 9 is arcuate in a vertical plane parallel to the longitudinal axis 4 of the container 2. As a result, the mixing members 12 reach all regions of the base wall 9 so that no feed remains unmixed.

Although the drawings show mixing shafts 11 comprising four mixing members 12, it is advantageous to provide the mixing shaft 11 with five mixing members 12 evenly angularly spaced on the mixing shaft 11. Five mixing members 12 allows the feed material to be kept in constant motion during mixing thereby increasing the efficiency and quality of mixing and reducing the power required to drive the mixing shaft 11. It will be appreciated however that the invention is not limited to a particular number of mixing members 12.

The mixing members 12 comprise mixing paddles 20. The mixing paddle 20 includes one or more elongate separator members in the form of fingers 21 which assist in pulling compacted or entangled fibrous feed material apart and mixing it with other feed ingredients. The mixing paddle 20 also includes a lifting member 22 in the form of a strip of resilient flexible material, rubber for example, to facilitate lifting the feed material while at the same time not overstressing the feed.

The lifting member 22 is mounted on a mixing paddle 20 in relation to a corresponding finger 21 so that when a mixing paddle 20 is positioned near the discharge trough 16 the lifting member 22 is positioned above the finger 21 and when the mixing paddle 20 is positioned diametrically remote the discharge trough 16 the lifting member 22 is positioned below the finger 21. Accordingly, when the mixing shaft 11 rotates in the first direction, i.e. during mixing, a finger 21 of a mixing paddle 20 leads and strikes the feed first ahead of a corresponding lifting member 22, whereas the lifting member 22 is deflected by the feed material backwards in relation to the direction of the rotation of the mixing shaft 11. This arrangement enables the fingers 21 to break down and mix the feed material while at the same time preventing the feed from being pushed into the discharge trough 16. Conversely, when the mixing shaft 11 rotates in the second direction (i.e., during discharge), a lifting member 22 of a mixing paddle 20 leads and contacts the feed first ahead of a finger 21 while at the same time the finger 21 supports the lifting member 22 and prevents the lifting member 22 from being deflected by the feed material backwards in relation to the direction of the rotation of the mixing shaft 11 and as a result, the lifting member 22 pushes the feed material towards and into the discharge trough 16.

The container 2 comprises a plurality of blades 30, which are preferably serrated, mounted inside the container 2 protruding inwardly from the end walls 7 or from the base wall 9 of the container 2. The blades 30 facilitate the separation of the compacted or entangled fibrous feed material into looser and/or smaller portions thereby aiding in achieving a consistent mix.

The blades 30 are movably arranged to be fully or partially retracted from the interior of the container 2 via slots (not indicated by a numeral) formed in the end walls 7 or the base wall 9 of the container 2. In embodiments herein described, the blades are rotatable about pivot points 31 and are movable by rams 32, for example, hydraulic rams. This function is beneficial in that it allows the distance the blades 30 protrude into the container 2 to be regulated depending on the material being mixed and also allows the blades 30 to be retracted fully from interior of the container 2 when their use is not required, or is not desirable.

The container 2 is mounted on the chassis 3 via weight cells 40, which are preferably electronically controlled, to measure the weight of the feed material in the container 2.

The distance between the end walls 7 is equal or greater than the distance between the side walls 8, whereas the height of the container 2 is equal or greater than the width (i.e., the distance between the side walls). This configuration is made possible due to the orientation of the mixing shaft 11 transverse the longitudinal axis 4 of the container 2, thereby enabling the container 2 to retain the width and the length within the known maneuverability limits while allowing the height of the container 2 to be increased compared to known diet feeders, thereby considerably increasing the mixing capacity of the container 2.

The discharge auger 18 is driven by a motor, such as, for example, an hydraulic motor 50.

Figure 9:
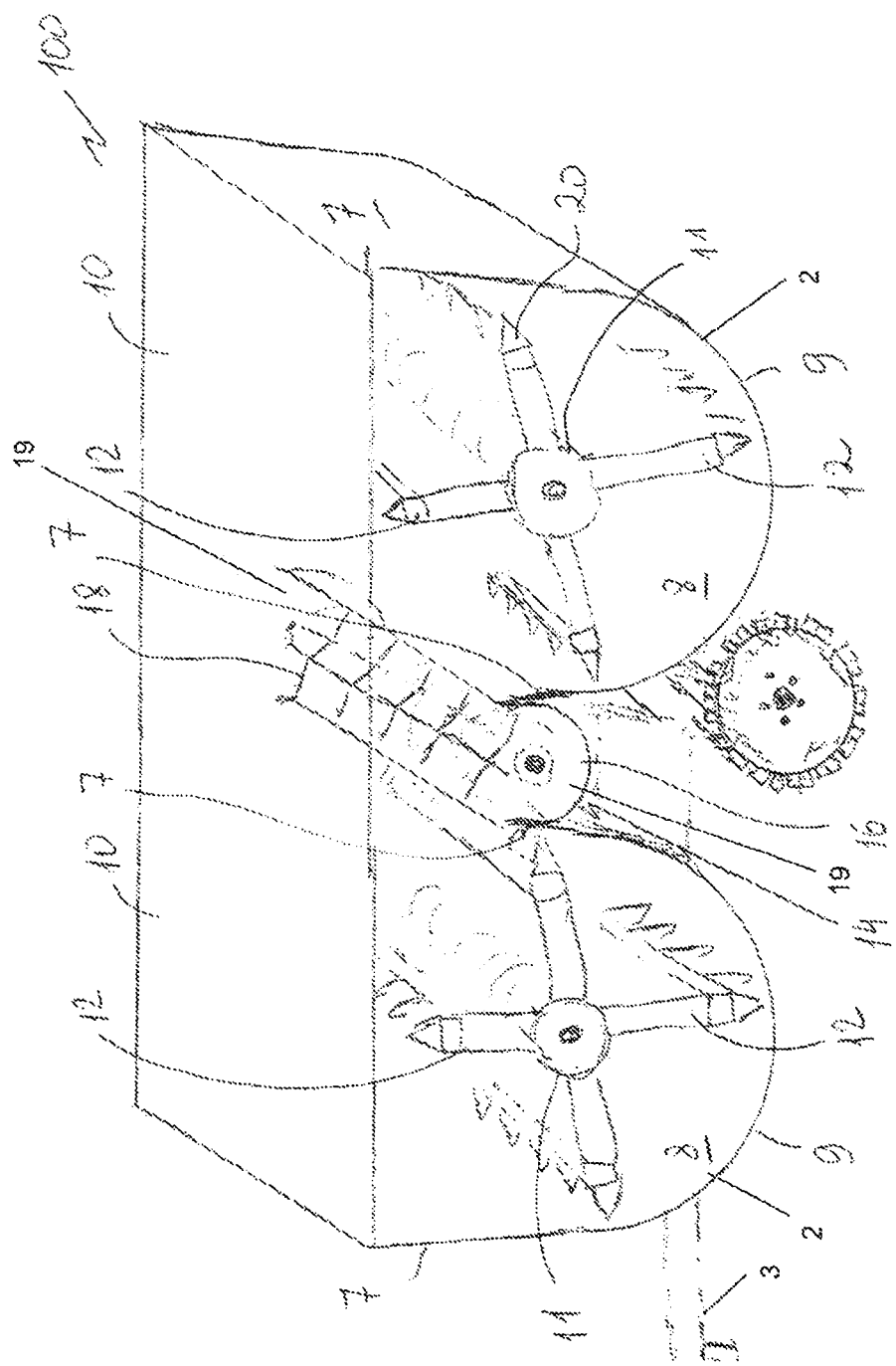
FIGS. 9 and 10 are schematic side views of yet another embodiment of a diet feeder, having a pair of containers for mixing and dispensing feed with a common dispensing auger provided between the two containers.
Figure 10:
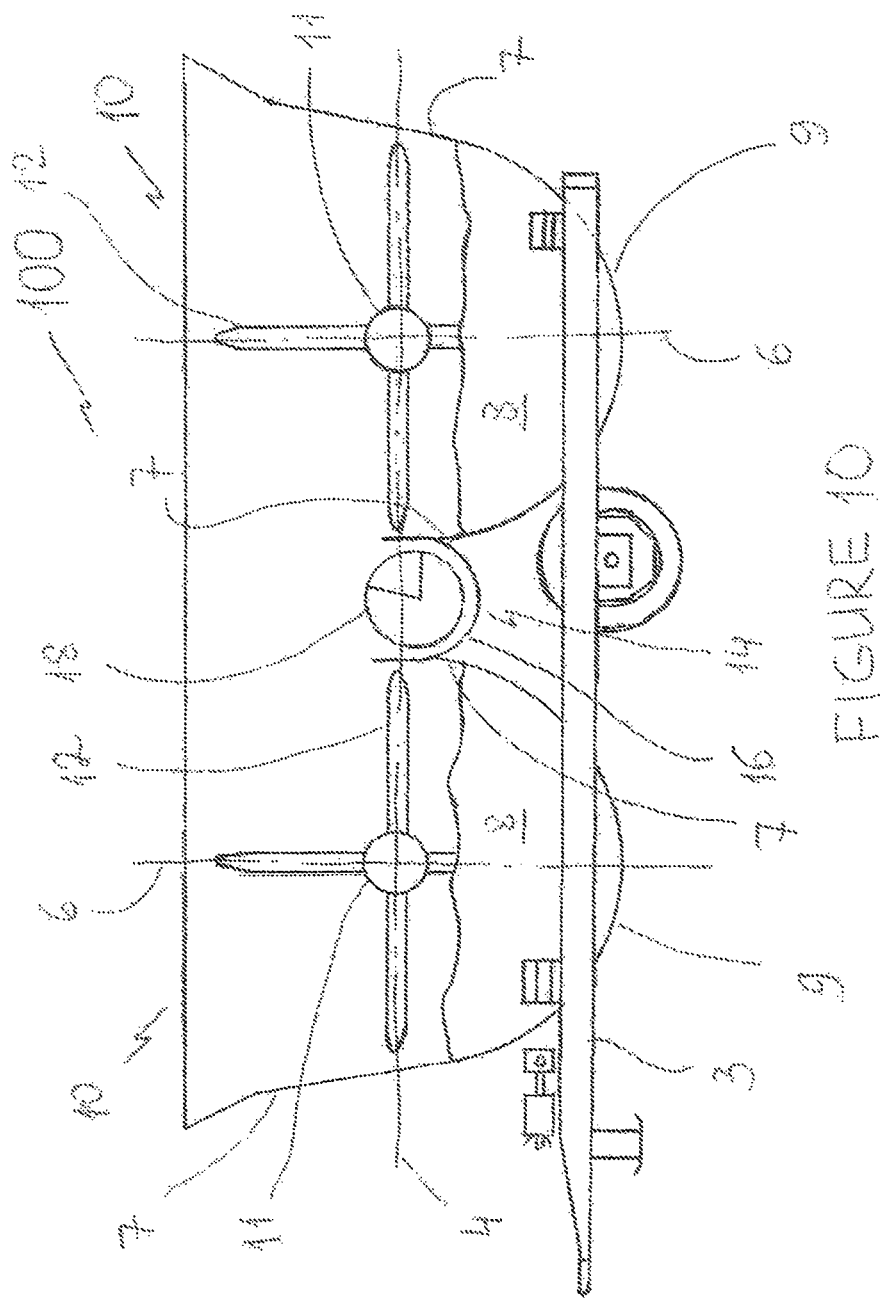

Referring to FIGS. 8, 9, and 10, in an advantageous embodiment, the apparatus 100 comprises two containers 2 joined at their adjacent end walls 7. The mixing shafts 11 of the containers 2 can be driven by the same drive mechanism, either simultaneously, or one mixing shaft 11 at a time. Alternatively, the mixing shafts 11 can each be driven by separate drive mechanisms. In one variation of this embodiment, shown in FIG. 8, each container 2 comprises a discharge arrangement 14 at the end wall 7 of the container 2 remote the joined end walls 7. Alternatively, a shown in FIGS. 9 and 10, the discharge arrangement 14 is provided between the adjoining end walls 7 of the containers 2. The first and second directions of the mixing shafts 11 of the adjacent containers 2 are adapted accordingly, i.e. the mixing shafts 11 of the adjacent containers 2 rotate in opposite directions and operate as mirror images of each other for mixing and discharging the feed. It will be appreciated that containers 2 of FIGS. 9 and 10 can also have discharge troughs at their free end walls 7 and containers 2 of FIG. 8 can have a discharge arrangement 14 provided between the adjoining end walls 7 of the containers 2.

Preferably, a reversing mechanism, such as, for example, a reverse gearbox (not shown), is provided for changing the direction of rotation of the mixing shaft 11 so that the mixing shaft 11 can discharge the feed to discharge arrangements provided at opposite end walls 7 of the container 2. The reversing mechanism can be required in a single container 2 having discharge arrangements provided at opposite end walls 7 or in a double or multiple container arrangements having discharge arrangements at free end walls 7 and at joined walls 7. In one embodiment, the reversing mechanism is provided as a single unit together with the redirecting means.

Figure 11:
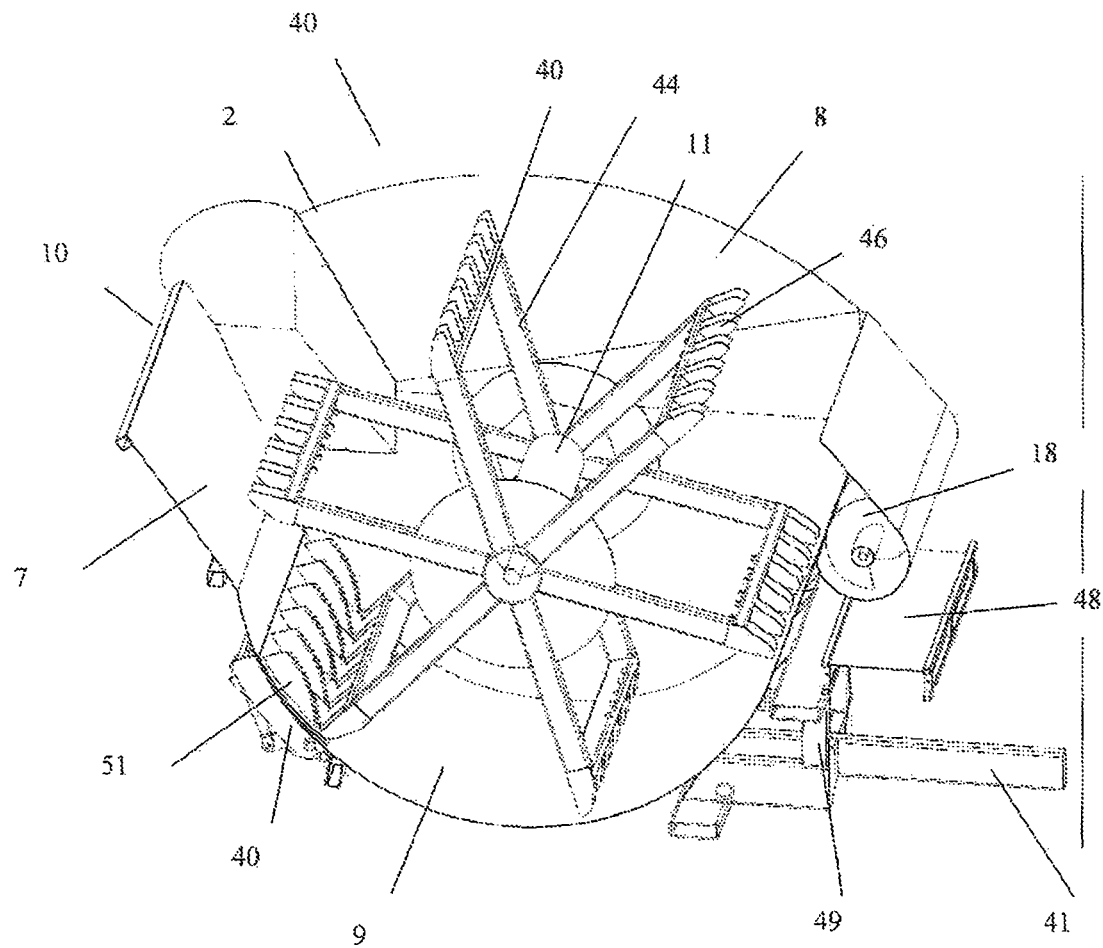
FIG. 11 is a schematic side view of a further embodiment of a diet feeder.

Referring now to FIG. 11 an extruding apparatus 40 is shown according to another embodiment of the invention. The extruding apparatus 40 is substantially similar to the extruding apparatus 1 which has been described with reference to FIGS. 1 to 5, and similar components are identified by the same reference numerals.

The feed mixing and dispensing apparatus 40 comprises at least one container 2 mountable on a chassis 41 connectable to a vehicle (not shown), such as a tractor. The container 2 has a pair of opposite end walls 7, a pair of opposite side walls 8 and a base wall 9. The end walls 7, the side walls 8 and the base wall 9 define an interior and a top opening 10 of the container 2.

In this embodiment of the invention the base wall of the apparatus is arcuate in a vertical plane parallel to the longitudinal axis of the container, thereby allowing the mixing members to reach all regions of the base wall so that no feed remains unmixed.

The container 2 comprises a mixing shaft 11 rotatably mounted within the interior of the container 2. The mixing shaft 11 is connected to a drive mechanism 42 on the exterior of the container 2 as shown in particular in FIG. 13 which is connected to a drive mechanism of the vehicle.

The mixing shaft 11 extends substantially horizontally between the side walls 8 substantially perpendicular to the longitudinal axis of the container and comprises mixing paddles 43 extending radially from the mixing shaft 11 to the end walls 7 and the base wall 9 of the container 2. The mixing paddles 43 are suitably configured to break up and mix the feed.

The mixing paddles 43 comprise a pair of side arms 44 extending radially from the mixing shall 11 and comprise a cross member 45 connecting the side arms 44 at an end distal from and substantially parallel to the mixing shaft 11. The cross members 45 comprise a plurality of spaced apart spokes 46 extending radially from the cross member 45. Preferably the spokes 46 are spaced in paired arrangement along the cross member 45. Most preferably the cross member 45 comprises at least six pairs of spokes along the cross member 45. The spokes are substantially planar and comprise a straight edge and a tapered edge.

The diameter of the mixing paddles 43 extending radially from the mixing shaft 11 is almost twice the length of the mixing shaft 11. The diameter of the mixing paddles 43 may be three meters in length (roughly equivalent to eleven feet) with the mixing shaft 11 around six feet. The large diameter allows for large round or square bales to be directly dropped into the apparatus for shredding and mixing. Consequently there is less requirement to manage the size input of material into the container and less time and effort required in loading the container.

Figure 15:
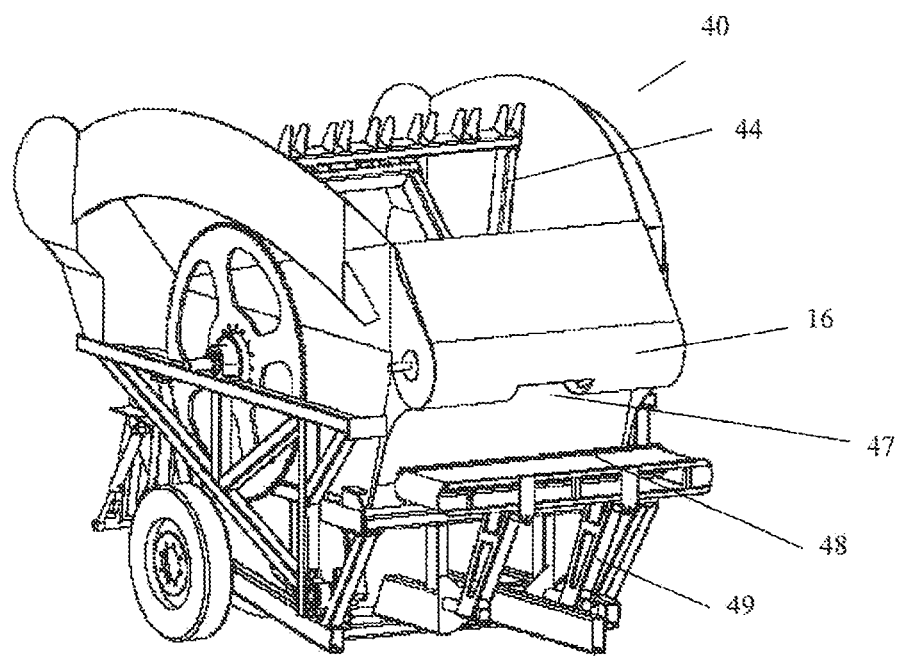
FIG. 15 is a schematic front view of the diet feeder of FIG. 11.
Figure 16:
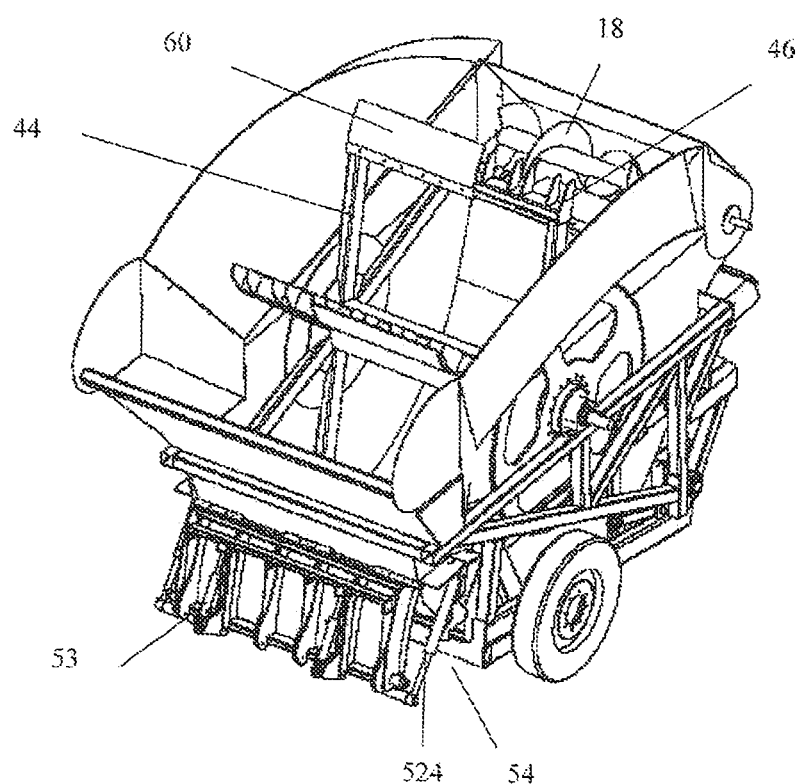
FIG. 16 is a schematic rear view of the diet feeder of FIG. 11.

In one embodiment the mixing paddles 43 may include as shown in particular in FIG. 15 a lifting member 60 in the form of a strip of resilient flexible material, for example rubber, to facilitate lifting the feed material into the discharge arrangement while at the same time not over-stressing the feed. The lifting member 60 is mounted along one half of cross member 43. Each alternate paddle 43 has a lifting member 60 on different sides. The lifting member 60 in this embodiment operates substantially as described above.

The container 2 comprises a plurality of blades 51, preferably, serrated blades, mounted inside the container 2 protruding inwardly from the end wall 7 of the container.

Figure 12:
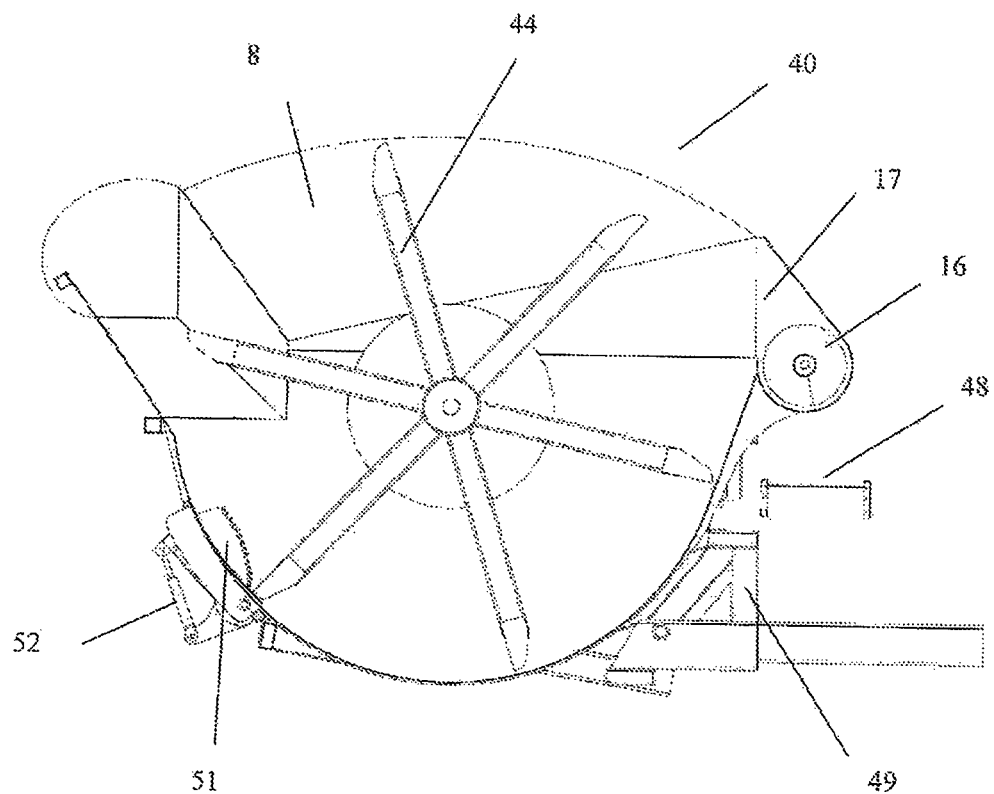
FIG. 12 is a side cross sectional view of the diet feeder of FIG. 11.

The blades 51 are movably arranged to be fully engaged (FIG. 11) or retracted (FIG. 12) from the interior of the container 2 through slots (not indicated by a numeral) formed in the end walls or the base wall of the container 2.

The blades 51 are movable by a ram arrangement 52 which in this embodiment comprises two rams for moving the blades 51 from a working to a non-working position. The blades 51 also comprise additional rams 53 which allow the depth of the blades to be altered when in a working position. This allows a farmer better control of the length that straw bales, baled silage or other feed material is cut so as to suit an animal's digestive system. The blades 51 and ram arrangement 52 may also comprise a rapid discharge arrangement 54 connected to the hydraulically controlled cutting blades 51.

Figure 13:
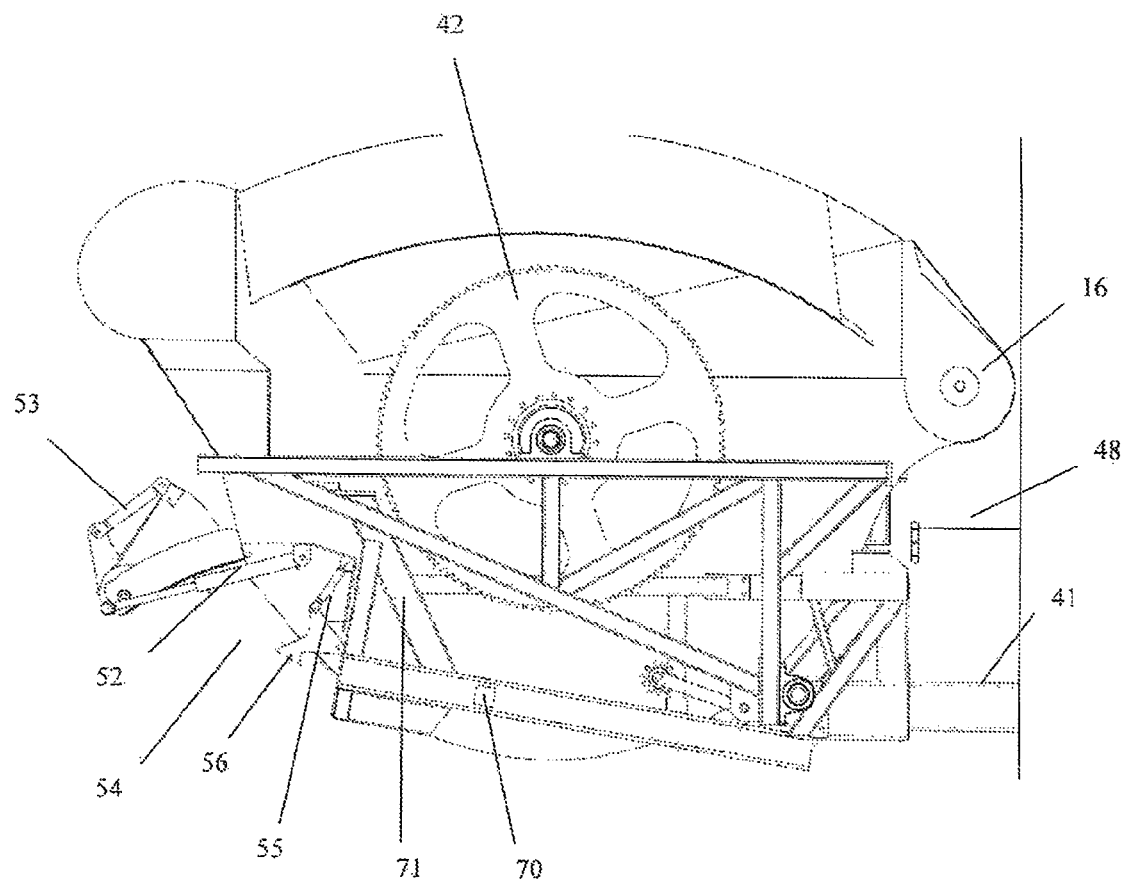
FIG. 13 is further schematic side view of the diet feeder of FIG. 11 with a discharge arrangement in its open position.
Figure 14:
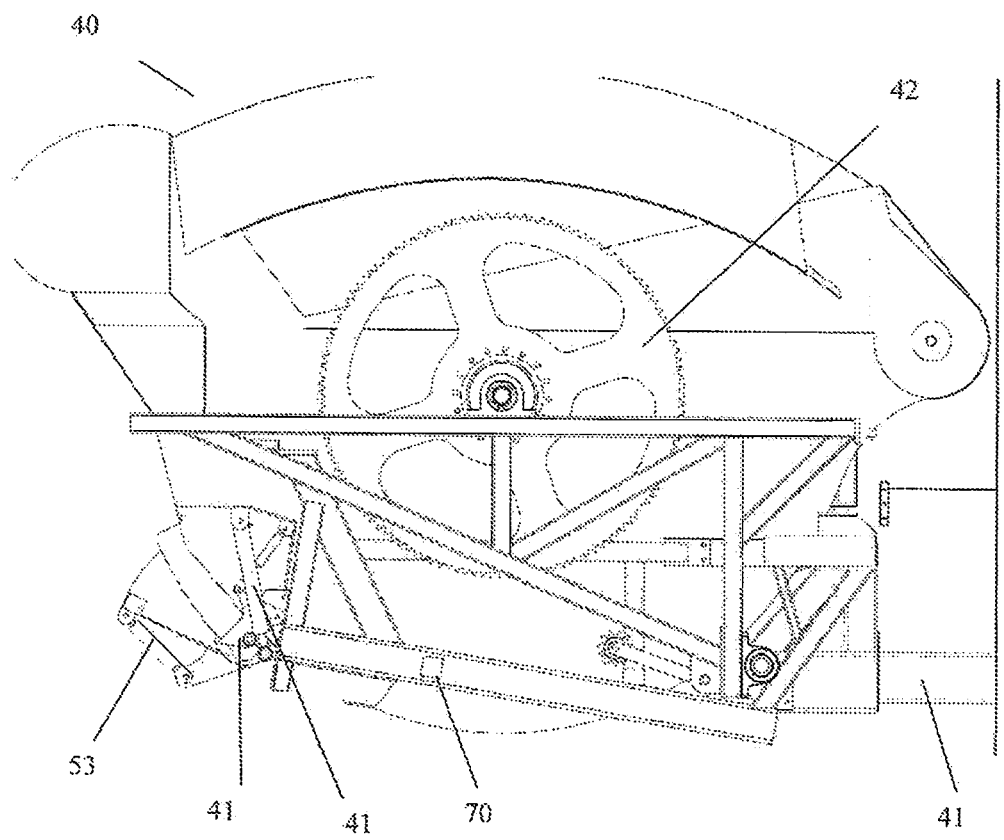
FIG. 14 is schematic side view of the diet feeder of FIG. 11 with a discharge arrangement in its closed position.

The discharge arrangement 54 comprises a opening which is movable very quickly between an open and shut state by another ram arrangement 55 comprising at least two rams. FIG. 13 shows a latch 56 released to allow mixed feed to be discharged rapidly from the container 2 onto the ground as the container 2 is moved in a forward direction. FIG. 14 shows the latch 56 closed and the discharge arrangement 54 in its closed position.

A feed discharge arrangement 14 is provided at an end wall 7 of the container 2 elevated from the base wall 9 of the container 2. The discharge arrangement 14 is arranged in communication with the interior of the container 2 for discharging the mixed feed from the container 2. In the embodiment described herein, the discharge arrangement 14 is provided nearer the top opening 10. As the mixing paddles are very large this means that the discharge arrangement 14 is quite high up and allows for easier delivery of feed over feeding barriers etc. In other embodiments, the discharge arrangement 14 may be provided approximately midway between the base wall 9 and the top opening 10 or nearer the base wall 9 than the top opening 10.

The feed discharge arrangement 14 comprises a trough 16 having an open longitudinal side 17. The trough 16 extends along an end wall 7 of the container so that the open longitudinal side 17 is in communication with the interior of the container 2. The trough 16 is mounted alongside the end wall 7 so that the open side 17 of the trough 16 adjoins the end wall 7 for receiving the mixed feed from the interior of the container 2.

A discharge auger 18 is rotatably mounted along the trough 16 for transferring the feed along the trough 16 to an outlet opening 47 (FIG. 15) provided in the center of the trough 16. In this embodiment the chassis 41 comprises a conveyor located substantially horizontally below the outlet opening 47.

The chassis 41 has side arms 49 to hydraulically move the conveyor 48 from side to side so that feed may be delivered to one side or the other as required.

Figure 17:
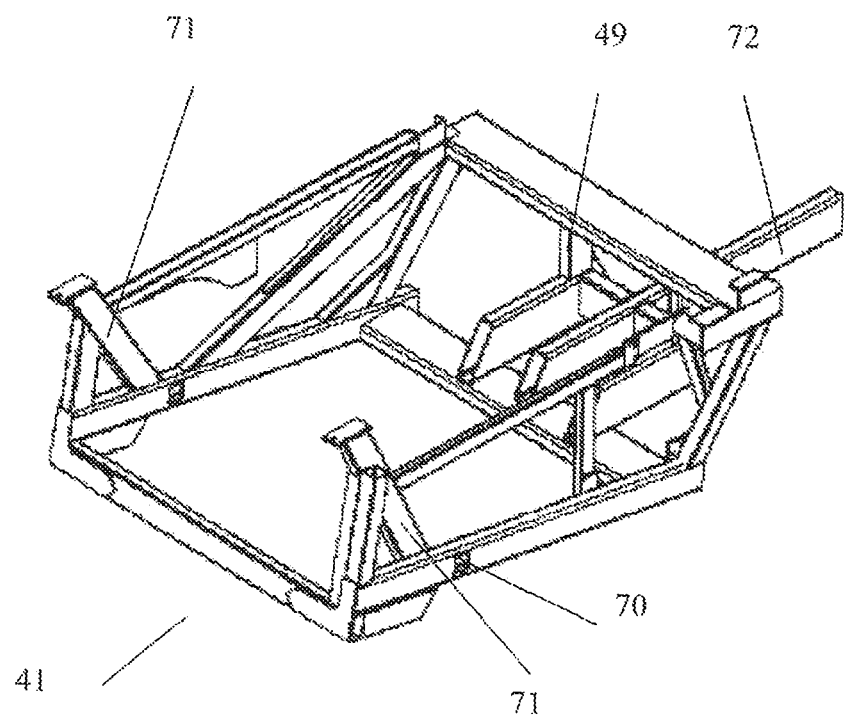
FIG. 17 is schematic side view of a chassis.

FIG. 17 shows the chassis of the invention in more detail. The chassis 41 comprises a support for the container 2 and supports the drive mechanism for mixing the feed in the container as shown in FIGS. 13 to 16. Preferably, the container is mounted on load cell weighing points (not indicated by a numeral in this instance). The chassis in this embodiment comprises a short stub axle 70 as the wheel axle cannot pass through the large mixing container. The short stub axle has to be able to sustain a lot of stress. The short stub axle comprises a special member 71 going up from the stub 70 to take the side strain. The member goes upwards at an angle and connects with a main load cell weighing point. This stabilizes the side load on the stub axle and prevents the stub axle from splaying out. The chassis does not come in contact with the container except at the four load cell weighing points. The front of the chassis goes up at a right angle and takes the support or back strain imposed by the draw bar 72 from another member reaching back to the stub member at the correct height level.

The embodiments set forth herein are discussed by way of example and not limitation. Persons skilled in the art may be able to recognize or through routine experimentation ascertain various equivalents to embodiments of the invention described in the foregoing specification. The scope of the invention is thus intended to encompass those equivalents as recited in the following claims.

I claim:

1. A feed mixing and dispensing apparatus comprising:
a container mountable on a transport, the container having a longitudinal axis, a transverse axis, a vertical axis, a pair of opposing end walls, a pair of opposing side walls and a base wall, the end walls, the side walls and the base wall defining an interior and a top opening of the container,
wherein when the longitudinal axis of the container in use extends substantially parallel to the container's direction of travel and the transverse axis is substantially perpendicular to the container's direction of the travel;
the container comprising a mixing shaft rotatably mounted within the interior, the mixing shaft connected to a drive mechanism;
wherein the mixing shaft extends between the side walls substantially perpendicular to the longitudinal axis and comprises mixing members extending radially from the mixing shaft toward the end walls and the base wall, the mixing members configured to break up and mix the feed;
wherein the mixing members comprise a plurality of mixing paddles, wherein the mixing paddles comprise a pair of side arms extending radially from the mixing shaft and comprise a cross member connecting the side arms at an end distal from and substantially parallel to the mixing shaft, wherein the cross members comprise a plurality of spaced apart spokes extending radially from the cross member, the spokes configured to interlace through a plurality of blades extending from the base wall, and wherein the diameter of the mixing paddles extending radially from the mixing shaft is almost twice the length of the mixing shaft; and
wherein a discharge apparatus is provided in communication with the interior for discharging mixed feed from the container.

2. The feed mixing and dispensing apparatus of claim 1 wherein the distance between the end walls is equal to or greater than the distance between the side walls.

3. The feed mixing and dispensing apparatus of claim 1 wherein the height of the container is equal to or greater than the distance between the side walls.

4. The feed mixing and dispensing apparatus of claim 1 wherein the base wall is arcuate in a vertical plane parallel to the longitudinal axis, thereby allowing the mixing members to reach all regions of the base wall.

5. The feed mixing and dispensing apparatus of claim 1 wherein the mixing shaft is mounted substantially horizontally.

6. The feed mixing and dispensing apparatus of claim 1 further comprising a mixing shaft driver configured to be coupled to and powered by a drive mechanism of a towing vehicle.

7. The feed mixing and dispensing apparatus of claim 1 wherein the mixing members are mutually configured so that when the mixing shaft rotates in a first direction feed is retained in the interior and mixed, and when the mixing shaft rotates in a second, opposing direction feed is transferred by the mixing members into the discharge apparatus.

8. The feed mixing and dispensing apparatus of claim 7 wherein a mixing member comprises a pair of side arms extending radially from the mixing shaft and further comprises a cross member connecting the side arms at an end distal from and substantially parallel to the mixing shaft.

9. The feed mixing and dispensing apparatus of claim 7 wherein a mixing member comprises a finger having a tapered end.

10. The feed mixing and dispensing apparatus of claim 9 wherein the planar finger includes a lifting member comprising a strip of resilient flexible material for facilitating lifting the feed material into the discharge apparatus.

11. The feed mixing and dispensing apparatus of claim 1 wherein the discharge apparatus is located in a position chosen from the list of: elevated from the base wall, midway between the base wall and the top opening, and near the top opening than the base wall.

12. The feed mixing and dispensing apparatus of claim 1, wherein the discharge apparatus comprises a trough having a rotating discharge auger and an open longitudinal side adjoining an end wall and in communication with the interior.

13. The feed mixing and dispensing apparatus of claim 1, wherein the container comprises a plurality of retractable blades, configured to facilitate separating compacted or entangled fibrous feed material, mounted on the container and movable to be inserted into and retracted from the container through slots formed in the container.

14. The feed mixing and dispensing apparatus of claim 13 further comprising a regulator governing the distance the blades protrude into the container.

15. The feed mixing and dispensing apparatus of claim 13 wherein the container comprises a discharge arrangement near the base of the container and connected to the retractable blades.

16. The feed mixing and dispensing apparatus of claim 1 wherein the container is mounted on a chassis connectable to a vehicle.

17. A feed mixing and dispensing apparatus comprising:
a plurality of containers, each mountable on a transport, the containers having a longitudinal axis, a transverse axis, a vertical axis, a pair of opposing end walls, a pair of opposing side walls and a base wall, the end walls, the side walls and the base wall defining an interior and a top opening of each containers;
wherein when the containers are transported, the longitudinal axis extends substantially parallel to the containers' direction of travel and the transverse axis is substantially perpendicular to the containers' direction of the travel;
the containers each comprising a mixing shaft rotatably mounted within the interior, the mixing shaft connected to a drive mechanism;
wherein the mixing shaft extends between the side walls substantially perpendicular to the longitudinal axis and comprises mixing members extending radially from the mixing shaft toward the end walls and the base wall, the mixing members configured to break up and mix the feed;
wherein a discharge apparatus is provided in communication with the interior for discharging mixed feed from the containers;
wherein the mixing members comprise a plurality of mixing paddles, wherein the mixing paddles comprise a pair of side arms extending radially from the mixing shaft and comprise a cross member connecting the side arms at an end distal from and substantially parallel to the mixing shaft, wherein the cross members comprise a plurality of spaced apart spokes extending radially from the cross member, the spokes configured to interlace through a plurality of blades extending from the base wall, and wherein the diameter of the mixing paddles extending radially from the mixing shaft is almost twice the length of the mixing shaft; and
wherein the mixing members for multiple containers are in series and driven by a common source.

* * * * *